United States Patent [19]

Suga et al.

[11] 4,281,751

[45] Aug. 4, 1981

[54] AUTOMATIC GEAR SHIFTING METHOD

[75] Inventors: Masaaki Suga, Yokohama; Chiaki Kobayashi, Yokosuka; Hisaaki Tohzima, Yokohama, all of Japan

[73] Assignee: Nissan Motor Company, Limited, Yokohama, Japan

[21] Appl. No.: 23,557

[22] Filed: Mar. 26, 1979

[30] Foreign Application Priority Data

Apr. 17, 1978 [JP] Japan ................................. 53-44134

[51] Int. Cl.³ ............................................ B60K 41/28
[52] U.S. Cl. ................................ 192/0.092; 192/3.59; 74/877
[58] Field of Search ................ 192/0.048, 0.062, 0.073, 192/0.075, 0.076, 0.052, 0.092, 0.096, 3.58, 3.59; 74/877

[56] References Cited

U.S. PATENT DOCUMENTS

| 2,626,691 | 1/1953 | Price | 192/0.073 |
| 3,323,621 | 6/1967 | Peras | 192/0.092 |
| 3,667,577 | 6/1972 | Weymann | 192/0.092 |
| 3,693,605 | 9/1972 | Hirozawa | 192/0.092 |

FOREIGN PATENT DOCUMENTS

| 589078 | 12/1959 | Canada | 192/0.092 |
| 2631065 | 4/1977 | Fed. Rep. of Germany | 192/0.075 |
| 907659 | 10/1962 | United Kingdom | 192/0.092 |

Primary Examiner—George H. Krizmanich
Attorney, Agent, or Firm—Thompson, Birch, Gauthier & Samuels

[57] ABSTRACT

According to an automatic gear shifting method of the present invention, the actual gear shifting is carried out, when the throttle valve opening degree is greater than a predetermined opening degree, after the following steps have taken place, a step of initiating the closing movement of the throttle valve and when a predetermined time has passed after the initiation of the closing movement of the throttle valve a step of disengaging the clutch.

4 Claims, 10 Drawing Figures

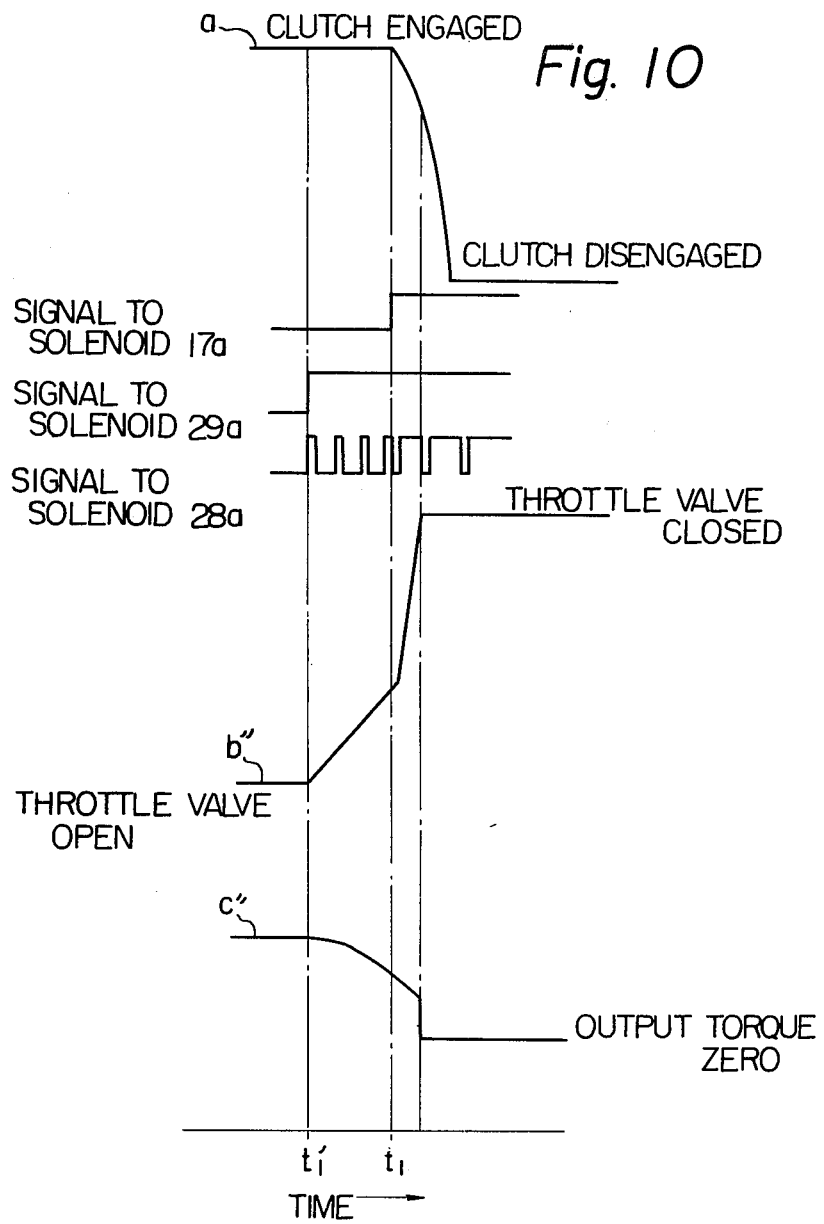

AUTOMATIC GEAR SHIFTING METHOD

BACKGROUND OF THE INVENTION

The present invention relates to an automatic gear shifting method for a motor vehicle installed with a manual gear box.

The manual gear boxes are advantageous over the automatic transmissions using a torque converter in their fuel economy because there is no power loss due to the slippage in the torque converter.

There have been many proposals as to automatic gear shifting method for the manual gear box transmission. A known automatic gear shifting method is graphically illustrated in FIG. 1.

Referring to FIG. 1, line a represents a clutch stroke, line b a throttle valve opening degree. As will be readily understood from this Figure, the closing movement of the throttle valve toward the closed position thereof and the clutch disengagement are initiated simultaneously at $t_1$ before the subsequent step of initiating the clutch reengagement at $t_2$ and the step of returning the throttle valve toward the initial opening degree at $t_3$. Actual gear shifting is effected when the clutch has been disengaged.

The problem encountered with this prior art method is in that a drop in the output torque due to the clutch disengagement will become rapid under the vehicle operating condition with large throttle opening degrees, thus causing uncomfortable deceleration during shifting operation under this condition. The present invention aims at solving this problem.

SUMMARY OF THE INVENTION

According to the present invention, there is provided an automatic gear shifting method in a motor vehicle including an engine with a throttle valve operatively connected to an accelerator pedal, a manual gear box and a clutch operatively disposed between the engine and the gear box, the method comprising the following steps when the setting of the throttle valve is wider than a predetermined opening degree: a step of initiating closing movement of the throttle valve from an initial opening degree which corresponds to a depression degree of the accelerator pedal to a closed position; a second step of disengaging the clutch when a predetermined time has passed after the occurrence of the first step; a third step of shifting into a gear in the manual gear box after the occurence of the second step; a fourth step of returning the throttle valve to the initial opening degree which corresponds to the depression degree of the accelerator pedal; a fifth step of reengaging the clutch.

BRIEF DESCRIPTION OF THE DRAWINGS

In the accompanying drawings:

FIGS. 9 and 10 are timing graphically representing a second preferred embodiment of the automatic gear shifting method of the present invention.

DESCRIPTION OF THE PREFERRED EMBODIMENTS

Figure 2:
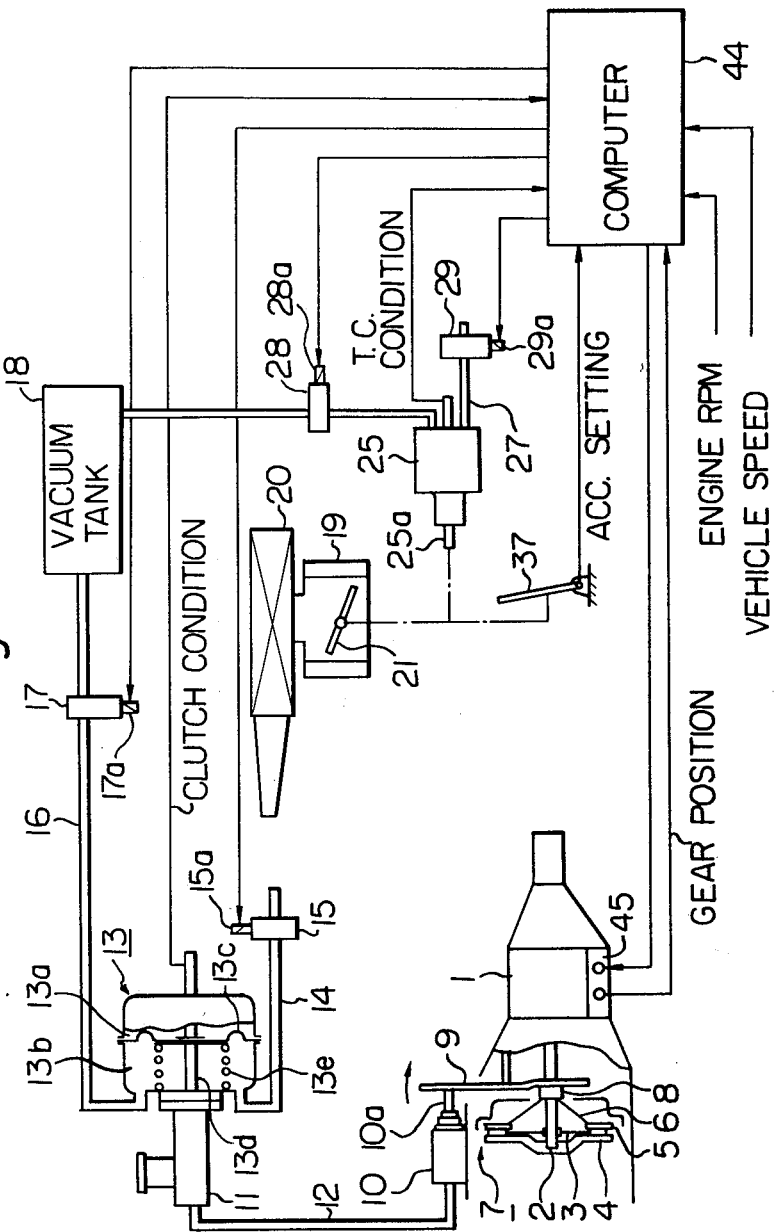
FIG. 2 is a schematic illustration of an automatic gear shifting system to which an automatic gear shifting method according to the present invention may be carried out.

FIG. 2 illustrates an automatic gear shifting system of a motor vehicle installed with a manual transmission in which system a method according to the present invention may be carried out.

In FIG. 2, a manual gear box of the conventional counter shaft type 1 is shown which includes an input shaft 2. Splined to the input shaft 2 is a clutch disc 3 of a single disc clutch including a pressure plate 5 and a diaphragm spring 6, the clutch being designated as the reference numeral 7.

Referring to the operation of the clutch 7, when a withdrawal lever 9 is in the illustrated position, the diaphragm spring 6 is permitted to compress the clutch disc 3 between a flywheel 4 and the pressure plate 5, connecting the input shaft 2 to the flywheel 4. When the lever 9 is pivoted clockwise, in the direction indicated by an arrow, by an operating cylinder 10 via an actuator rod 10a, the movement of the lever 9 moves a clutch release bearing 8 to bear against the diaphragm spring 6 to compress the latter, releasing the spring pressure exerted by the diaphragm spring 6, thus disconnecting the input shaft 2 from the flywheel 4.

The operating cylinder 10, which can disengage the clutch 7, is in communication with a master cylinder 11 by a conduit 12.

The master cylinder 11 is operatively connected with an actuator 13 via a push rod 13d of a master cylinder piston, not shown. The push rod 13d extends through a center of a diaphragm assembly 13c and fixed thereto at its inner periphery. The diaphragm assembly 13c has an outer periphery portion fixedly clamped by a front housing portion and a rear housing portion. The rear housing portion and the diaphragm assembly define an atmospheric chamber 13a opening to the atmosphere, while, the front housing portion and the diaphragm assembly define a vacuum chamber 13b. A piston return or diaphragm return spring 13e is disposed within the vacuum chamber 13b.

The chamber 13b is selectively communicable with the atmosphere through an atmosphere conduit 14 under the control of a normally closed solenoid valve 15 (or an air valve). The chamber 13b is selectively communicable with a vacuum tank 18 through a vacuum conduit 16 under the control of a normally closed valve 17 (or a vacuum valve). The vacuum tank 18 communicates with a suitable source of vacuum, an engine intake passageway in this embodiment, and keeps the vacuum therein at a predetermined value.

Energizing the solenoid 17a of the solenoid valve 17 will permit flow communication through the conduit 16, permitting the vacuum within the vacuum tank 18 to be transmitted to the vacuum chamber or working chamber 13b of the actuator 13. This causes the rod 13d to move leftwards, viewing in FIG. 2, thus operating the master cylinder 11 so that the master cylinder 11 displaces the oil through the conduit 12 to the operating cylinder 10. Then, the operating cylinder 10 is urged to move the plunger 10a in a projecting direction, pivotting the withdrawal lever 9 clockwise to disengage the clutch 7.

Deenergizing the solenoid 17a and energizing the solenoid 15a will cut the transmission of the vacuum to the chamber 13b and communicate the chamber 13a with the atmosphere. As a result, the rod 13d is moved by the spring 13e toward the position illustrated in FIG. 2. This return movement of the rod 13d permits the withdrawal lever 9 to pivot counterclockwise under the action of the diaphragm spring 6, so that the clutch returns to the engagement state by the diaphragm spring 6. During this process, the diaphragm spring 6 urges the plunger 10a into the operating cylinder to displace the oil toward the master cylinder 11 to follow return movement of the master cylinder piston together with the rod 13d toward the initial position. After the engagement of the clutch 7, the solenoid 15a is deenergized to close the conduit 14 to precondition for the subsequent or next clutch disengagement operation.

Also shown in FIG. 2 are a carburetor 19 connected to an air cleaner 20 and a throttle valve 21 of the carburetor. With this throttle valve 21 a throttle closer, which will be described hereinafter in connection with FIGS. 3 to 6, it is operatively associated.

Figure 3:
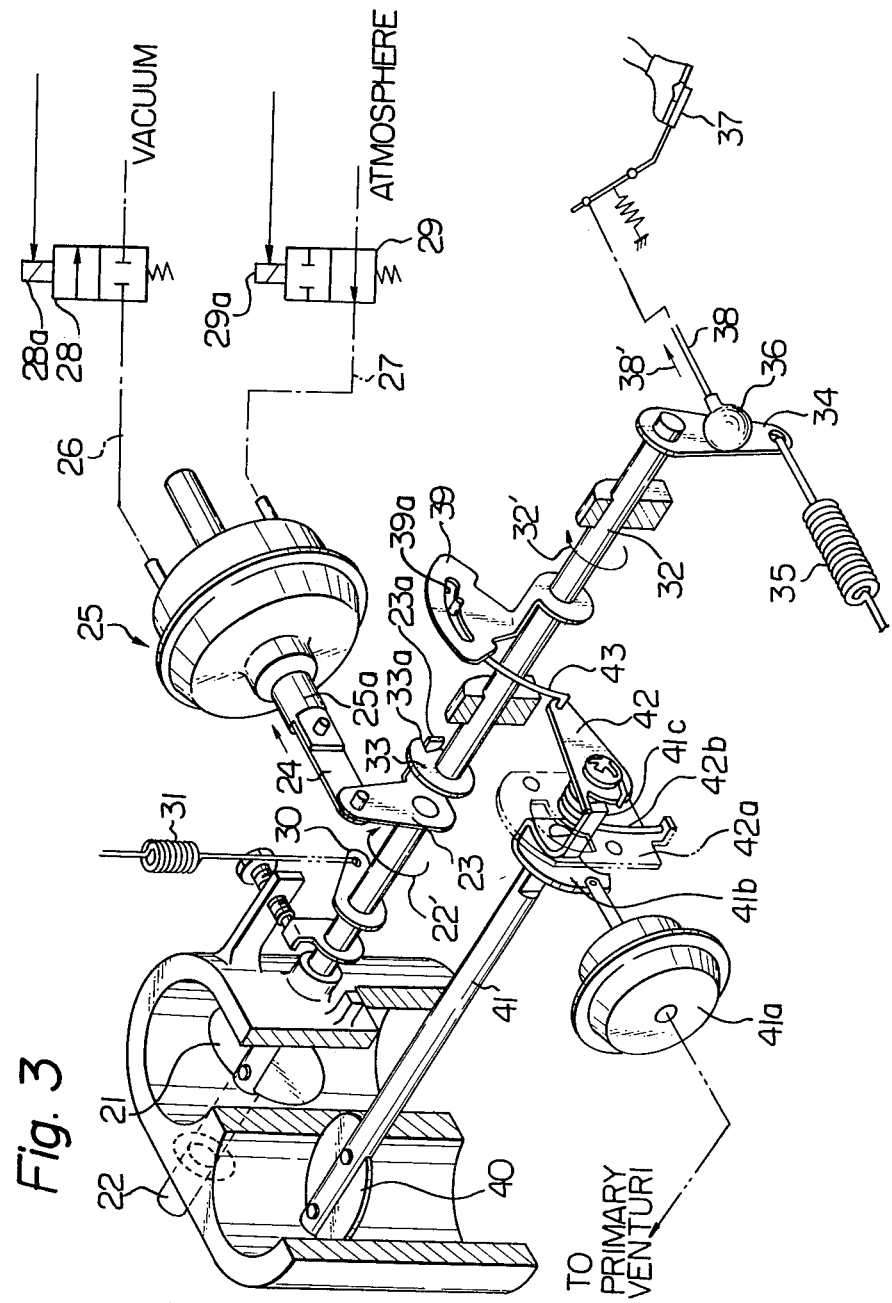
FIG. 3 is a perspective view of a throttle closer mechanism used in the system in FIG. 2.

Referring to FIGS. 3 to 6, the throttle closer is now explained. As shown in FIG. 3, the throttle valve 21 is non-rotatably connected to a primary shaft 22. At the free end of the primary shaft 22, an arm 23 is non-rotatably connected, this arm being referred to as a primary arm. Through a link rod 24 the primary arm 23 is operatively connected with a rod 25a of a closer actuator 25.

Figure 4:
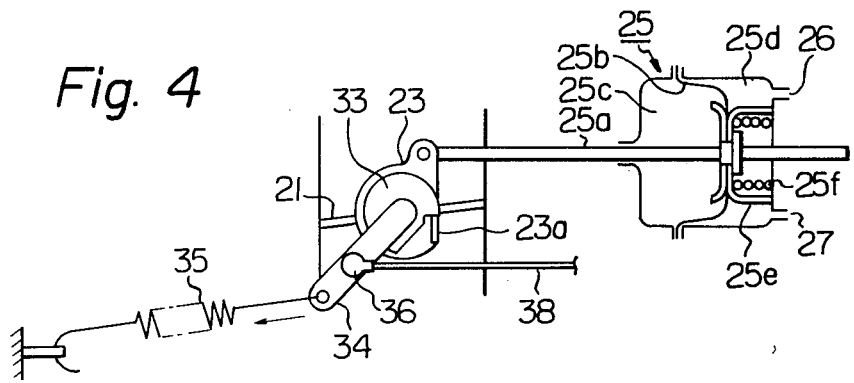
FIGS. 4 to 6 show various positions of the throttle valve and the associated throttle closer.

As diagrammatically shown in FIG. 4, the rod 25a is fixed to a diaphragm assembly 25b which separates an atmospheric chamber 25c from a vacuum chamber or working chamber 25d. A cup-shaped member 25e fixedly connected to the diaphragm assembly 25d acts as a stop to limit the movement of the rod 25a in the rightward direction, viewing in FIGS. 4 to 6. A return spring 25f is disposed in the chamber 25d to urge the rod 25a to the position illustrated in FIG. 5.

The chamber 25d communicates with the vacuum tank (see FIGS. 2 to 4) through a conduit 26 and communicates with the atmosphere through a conduit 27. These conduits 26 and 27 are provided with normally closed solenoid valves 28 and 29, respectively. These solenoid valves 28 and 29 close the conduits 26 and 27, when not energized, to block fluid communication through these conduits. Energization of the solenoid 28a will cause the valve 28 to open the conduit 26, allowing fluid communication therethrough. Likewise, energizing the solenoid 29a results in establishment of flow communication through the conduit 27.

The throttle valve 21 is urged in an opening direction by means of a throttle open spring, i.e., a weak spring 31 having one end anchoring an arm 30 fixed to the shaft 22 (see FIG. 3). The primary arm 23 fixed to one or free end of the shaft 22 is formed with a finger portion 23a which extends to operatively engage a claw portion 33a of an arm 33 fixed to a torsion shaft 32 at one end thereof. The primary shaft 22 and the torsion shaft 32 are arranged substantially coaxially and as axially spaced with each other. The finger 23a of the primary arm 23 is urged by the throttle open spring 31 against the claw 33a and thus rotational movement of the throttle valve 21 in the opening direction is limited by the claw 33a of the arm 33 fixed to the torsion shaft 32.

Adjacent the opposite end of the torsion shaft 32, an accelerator arm 34 is fixed to the torsion shaft 32 for rotating the latter. A return spring, i.e., a strong spring, 35 is anchored at the leading or free end of this arm 34. Via ball joint 36 the arm 34 is operatively connected to an accelerator link 38 leading to an accelerator pedal 37.

The return spring 35 urges the shaft 32 in a rotational direction as indicated by an arrow 32'. The return spring 35 has a spring force strong enough to urge, against the spring force of the open spring 31, the throttle valve 21 toward the fully closed position to keep the latter closed when the accelerator pedal 37 is released. The spring force of the spring 35 is transmitted to the shaft 22 through the arm 33, claw 33a, finger 23a and arm 23, thus urging the throttle valve 21 toward the fully closed position.

Referring to a mechanism to operate a secondary throttle valve 40 non-rotatably connected to a secondary valve shaft 41, a secondary actuating arm 39 fixed to the shaft 32 is formed with an arcuate opening 39a which extends coaxially with the shaft 32. An operative connection between this arm 39 and a secondary arm 42 is established by a connecting rod 43. One end of the rod 43 is bent to slide along the arcuate opening 39a and the opposite end thereof is anchored to the secondary arm 42.

This mechanism provides a lost motion connection between the torsion shaft 32 and the secondary arm 42 as long as the accelerator pedal 37 is manipulated within a range smaller than a predetermined depression degree because during this range the arm 39 is slidable relative to the rod 43.

The secondary arm 42 is pivotally mounted to a bracket 42a shown in phantom. A spring 42a is operatively connected between a projection of the bracket 42a and the secondary arm 42 to urge the secondary arm 42 counterclockwise, viewing in FIG. 3, toward the illustrated position.

When the accelerator pedal 37 has been depressed to the predetermined depression degree, the end wall of the arcuate opening 39a contacts with the bent end of the rod 43. Further depressing the accelerator pedal 37 beyond the predetermined degree will pivot the secondary arm 42 clockwise against the spring 42b.

The secondary throttle valve 40 can be opened from the illustrated position by means of a secondary throttle valve actuator 41a, in the form of a diaphragm device connected with the primary venturi. Operative connection between this actuator 41a and the secondary valve shaft 41 is established by an arm 41b which has an axially extending finger 41c positioned in abutting engagement with the secondary arm 42.

The secondary throttle valve actuator 41a opens the secondary throttle valve 40 in response to an increase in vacuum within the primary venturi vacuum. The secondary throttle valve 40 is urged toward a closed position, as illustrated in FIG. 3, by a diaphragm spring, not shown, mounted within the secondary throttle valve actuator 41a.

The throttle closer as described mainly in connection with FIG. 3 will cooperate with the actuator 25 that is incorporated in the system illustrated in FIG. 2 as follows:

When both the solenoids 28a and 29a are not energized:

Deenergization of the solenoid valve 28 will close the conduit 26, while deenergization of the solenoid valve 29 will open the conduit 27. As a result, the operating chamber 25d of the actuator 25 is open to the atmosphere and under this condition, the actuator rod 25a can be moved by the arm 23 as the latter pivots because the spring force of the spring 25f is so set as to allow this action (see FIGS. 3 to 6 also). Thus the rotational movement of the primary shaft 22 is not restrained.

Under this condition, if the accelerator pedal 37 is released (see FIG. 2), the primary throttle valve 21, primary arm 23 and return arm 33 will take the positions as illustrated in FIG. 4 in which the primary throttle valve 21 is closed.

Figure 5:
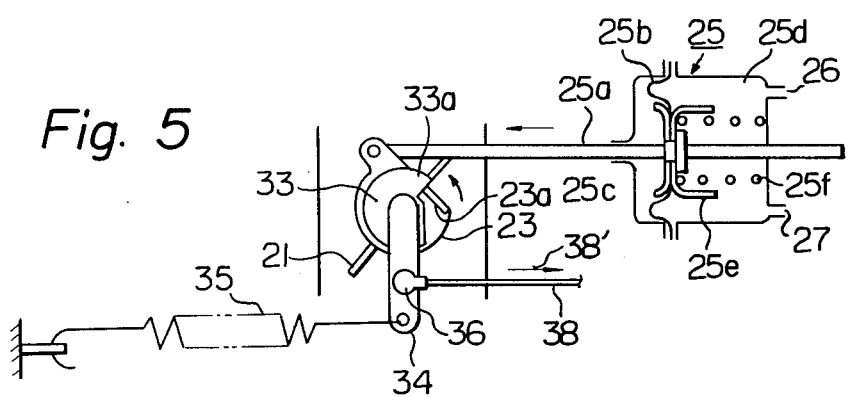

Depressing the accelerator pedal 37 will move the accelerator link 38 in a direction indicated by an arrow 38' (see FIG. 3 or FIG. 5), pivoting the accelerator arm 34 counter clockwise as viewed in FIG. 5 to rotate the torsion shaft 32 and the return arm 33 in a direction as indicated by an arrow in FIG. 5 (in the opposite direction to the arrow 32' in FIG. 3). Because the throttle open spring 31 urges the throttle shaft 22 in the same rotational direction as the torsion shaft 32 is rotated by the arm 34 and urges the finger 23a into engagement with the claw 33a, the primary throttle valve 21 will rotate in the opening direction as the accelerator pedal 37 is depressed. Thus, as shown in FIG. 5, the primary throttle valve 21 will take up an open position corresponding to the depression degree of the accelerator pedal 37.

Figure 6:
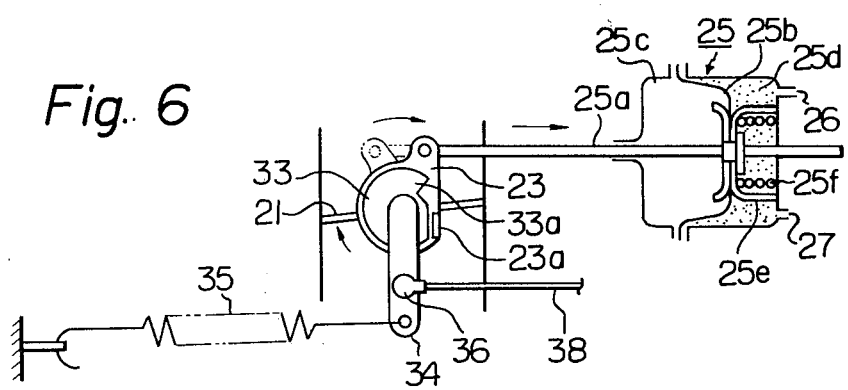

When both of the solenoids 28a and 29a are energized:

Energizing the solenoids 28a and 29a will open the conduit 26 and close the conduit 27. As a result, a vacuum develops in the operating chamber 25d of the actuator 25, thus causing the actuating rod 25a to move in a direction indicated by an arrow in FIG. 6 (or an arrow in FIG. 3) to take a retracted position as shown in FIG. 5. This movement of the actuating rod 25a will rotate the primary shaft 22 through the primary arm 23 against the spring 31 (see FIGS. 3 and 6). At the end of this movement of the rod 25a, the stopper 25e contacts with the end wall of the housing and the primary throttle valve 21 takes up the closed position, as shown in FIG. 6.

In this manner, when required, the primary throttle valve 21 can be held closed by the throttle closer even when the accelerator pedal 37 is depressed to a depressed position. Thus, it is possible, with this throttle closer, to prevent racing of the engine during disengagement period of the clutch 7 when the load on the engine shaft is zero.

When both of the solenoids 28a and 29a are again deenergized:

Redeenergization of the solenoids 28a and 29a will permit the rod 25a to follow rotational movement of the arm 23, thus giving no restraint on the rotational movement of the primary throttle valve 21. Then, as explained before, the primary throttle valve 21 can be moved to an opening position corresponding to the depression degree of the accelerator pedal 37.

Referring again to the system shown in FIG. 2, there is provided a computer 44 to which various input signals are fed as follows: Vehicle Speed Signal; Engine rpm Signal; Gear Position Signal; Acc. Setting Signal representing depression degree of the accelerator pedal 37; T. C. Condition Signal representing position of actuator rod 25a of the throttle closer actuator 25; and Clutch Condition Signal representing position of actuator rod 13d (stroke signal of the clutch 7). Output signals or command signals are fed to the shift control system 45 for the gear box 1, and solenoids 15a, 17a, 28a, 29a.

When the vehicle operating condition plunges into a state when the gear box 1 is to be shifted, the computer 44 detects this state by calculating the various inputs fed thereto.

Under the condition when the vehicle operates with the throttle valve 21 opening below an intermediate opening degree or a predetermined opening degree, the computer 44 will effect automatic gear shifting in the gear box 1 as sheduled for this condition as described before in connection with FIG. 1.

Figure 1:
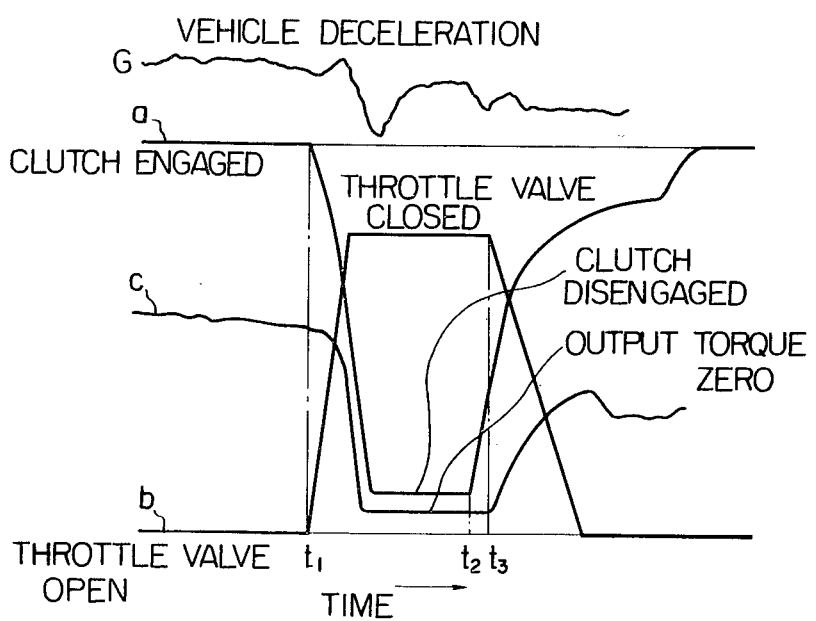
FIG. 1 is a timing diagram graphically representing the known automatic gear shifting method described before.

At the time of $t_1$ (see FIG. 1), the computer 44 provides command signals to energize the solenoids 17a, 28a and 29a, respectively. Then, the solenoid valve 17 opens the conduit 16, the solenoid valve 28 opens the conduit 26, and the solenoid valve 29 closes the conduit 27. As a result, the clutch actuator 13 disengages the clutch 7 and the closer actuator 25 urges the valve 21 toward its closed position. The actuator rod 13d of the clutch actuator 13 moves to cause disengagement of the clutch 7. The clutch condition signal or clutch stroke signal is fed to the computer 44 which gives information as to the state of the actuator rod 13d. With this signal the computer 44 detects the instance at which the clutch elements have disengaged from each other and upon detection of this instance provides a command signal to the shift control system 45 to cause it to effect gear shifting in the gear box 1. After completion of gear shifting in the gear box 1, viz., a time of $t_2$ in FIG. 1, the computer 44, which is given information by the gear position signal, causes the solenoid 17a to be deenergized and the solenoid 15a to be energized. As a result, the clutch actuator 13 permits the clutch 7 to be urged toward its engagement condition. At an time of $t_3$ as shown in FIG. 1 when the clutch elements are about to contact with each other, the computer 44 causes the solenoids 28a and 29a to be deenergized. As a result, the closer actuator 25 permits the throttle valve 21 to be restored to its initial position corresponding to the depression degree of the accelerator pedal 37, then completing the gear shifting.

Figure 7:
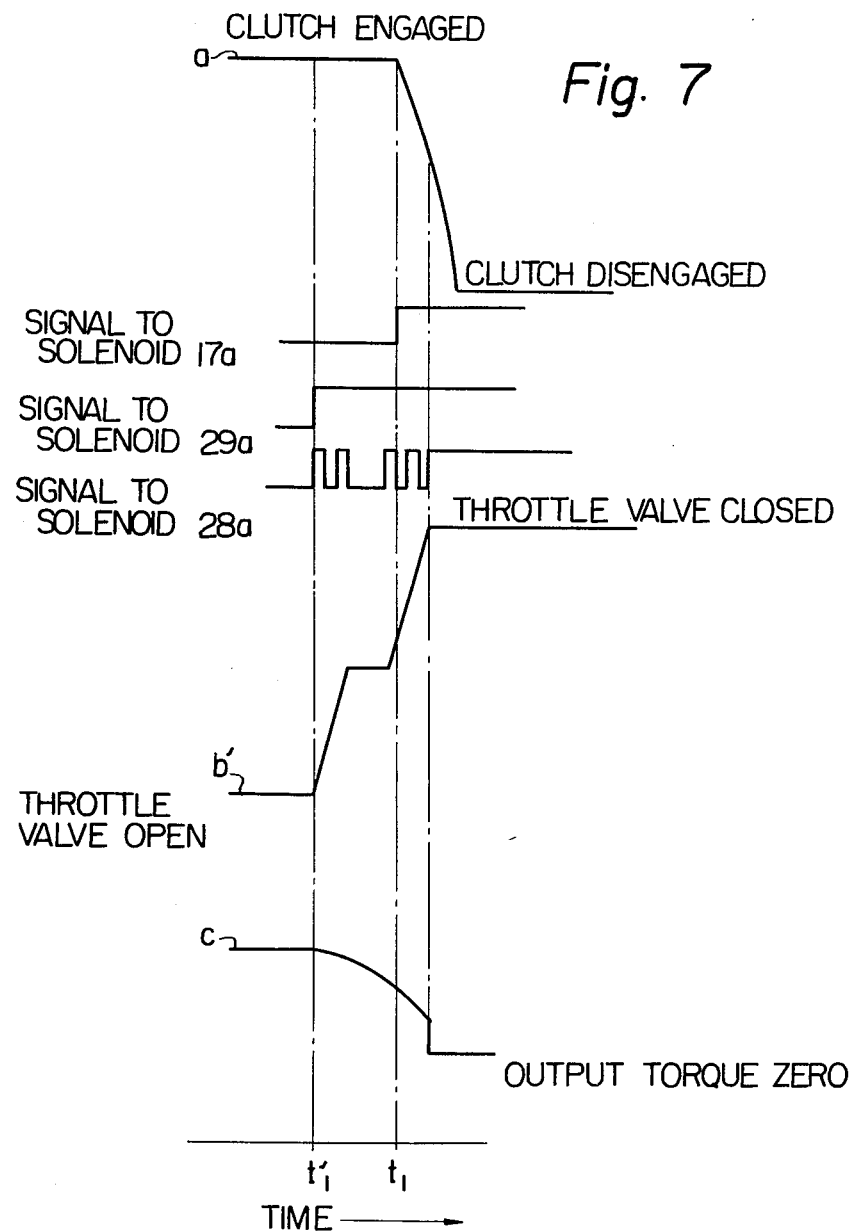
FIGS. 7 and 8 are timing diagrams graphically representing a first preferred embodiment of the automatic gear shifting method of the present invention.
Figure 8:
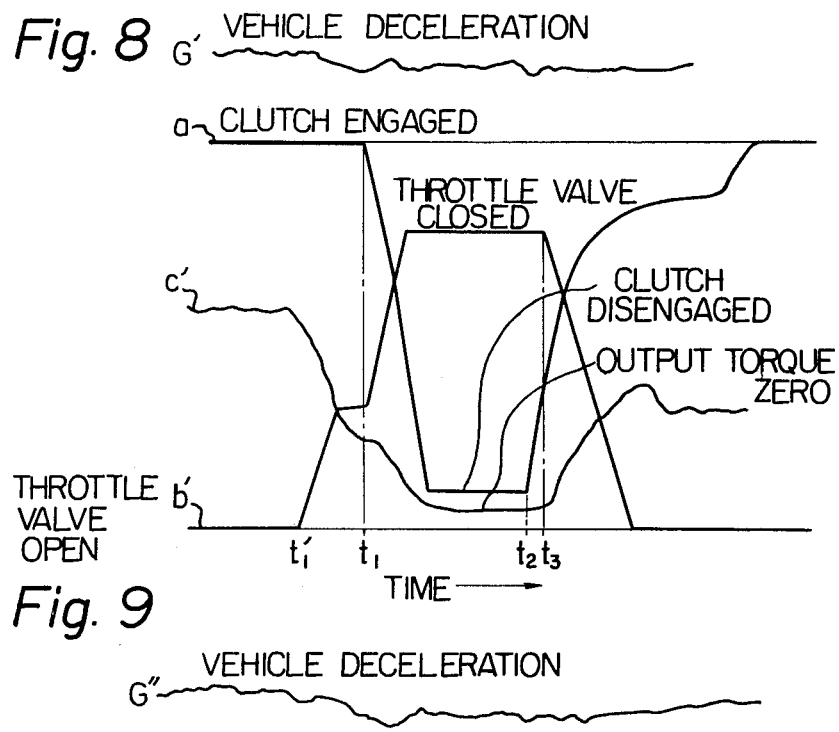

According to the method of the present invention, the clutch disengagement and reengagement operation upon gear shifting is effected as graphically represented in FIGS. 7 and 8 under the vehicle operating condition with the throttle valve 21 being in intermediate or wide opening degree as the accelerator pedal 37 is depressed deeply beyond a predetermined depression degree.

Under this vehicle operating condition, the computer 44 provides command signals to the solenoids 28a and 29a to energize the same at a time of $t_1'$ prior to or before the time of $t_1$ when the clutch 7 is about to be disengaged. The difference between $t_1'$ and $t_1$ is within the range from about 0.2 seconds to 0.5 seconds.

In other words, the computer 44 will provide a command signal causing the clutch disengagement after it provides command signals causing the energization of the solenoids 28a and 29a.

The output command signal fed to the solenoid 28a is in the form of a pulse signal, the pulse width of which varies in response to variation in vehicle operating condition. It will be noted that the throttle valve opening degree versus time characteristic line of a desired one such as the line b' may be obtained by controlling the pulse width of the pulse signal fed to the solenoid 28a.

According to the method of the invention, the computer 44 senses the movement of the actuator rod 25a of the throttle closer 25 during closing movement of the throttle valve to detect an instance when the throttle valve has been moved, in closing direction, to an intermediate opening degree between its closed position and the opening degree corresponding to the setting of the accelerator pedal 37. Then, the supply of the pulse signal to the solenoid 28a is suspended, causing the closing movement of the throttle valve to cease. Thereafter the closing movement of the throttle valve will resume. Curve C' in FIG. 7 shows variation vs. time characteristic of the output torque during closing movement of the throttle valve as a result of the controlled closing movement of the throttle valve as just described above in connection with FIG. 7.

Referring to FIG. 8, the variation vs, time characteristics of the output torque (line C') and that of the vehicle deceleration (line G') are shown during clutch disengagement and the subsequent reengagement (line a) when the throttle closing movement is controlled in the manner as described and illustrated by line b'.

As will be clear from FIG. 8, according to the automatic shifting method of the present invention, the opening degree of the throttle valve varies as shown by the line b' so that the decrease in output torque upon disengagement of the clutch is relatively slow as shown by the curve C' as compared to the rapid drop in output torque encountered according to the conventional method as shown in FIG. 1. Thus, the rapid deceleration due to the rapid drop in output torque have been reduced to an unnoticeable level according to the present invention, thus making contribution to upgrading the vehicle ride feel.

In order to decrease the engine braking effect which would result from the closing of the throttle valve, the pulse width of pulse signal fed to the solenoid 28a at the time of energizing the solenoid 28a should be set narrower than that of pulse signal fed to the solenoid 28a at the time of deenergizing the solenoid 28a. With this, a speed can be decreased in closing movement of the throttle valve until the throttle valve is moved to the intermediate opening degree when the supply of the pulse signal is suspended temporarily. Thus, the engine braking effect can be decreased to a sufficiently low level.

Figure 9:
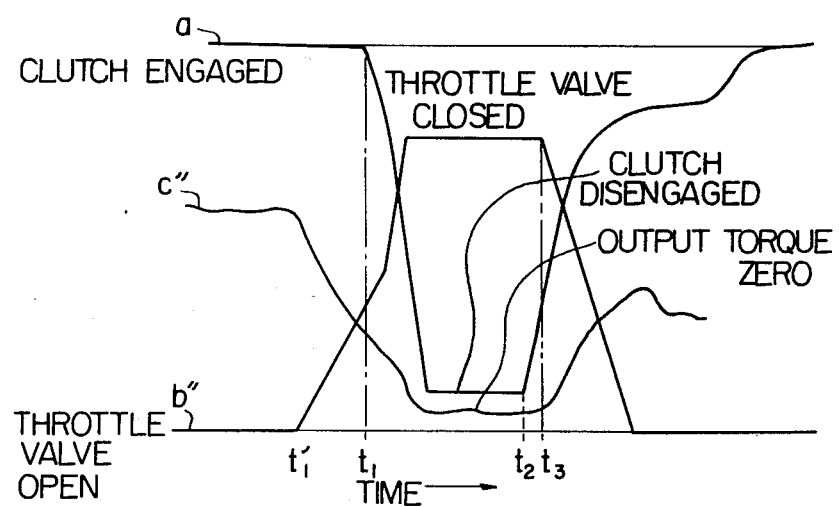

Referring to FIGS. 9 and 10, another form of the automatic shifting method of the present invention is illustrated wherein as will be clear from FIGS. 9 and 10, the closing speed of the throttle valve is slow until the throttle valve moved to the intermediate opening degree and thereafter the closing speed of the throttle valve is increased as shown by the line b" in FIG. 9. This has resulted in slow decrease in output torque as shown by line C" and thus in prevention of rapid deceleration (see line G"). Hence, good ride feel.

The above mentioned control for reduction in the closing speed of the throttle valve can be effected by decreasing the pulse width of the pulse signal fed to the solenoid 28a until the throttle valve is moved to the intermediate opening degree. Thereafter the pulse width is increased.

What is claimed is:

1. An automatic gear shifting method in a motor vehicle including an engine with a throttle valve operatively connected to an accelerator pedal, a manual gear box and a clutch operatively disposed between the engine and the gear box, said method being carried out with the accelerator pedal kept depressed to a depression degree and comprising the following steps when the setting of the throttle valve is wider than a predetermined opening degree:

a step of initiating closing movement of the throttle valve independently of the accelerator pedal from an initial opening degree which corresponds to said depression degree of the accelerator pedal to a closed position;

a second step of disengaging the clutch when a predetermined time has passed after the occurrence of said first step;

a third step of shifting into a gear in the manual gear box after the initiation of said second step;

a fourth step of initiating return movement of the throttle valve to said initial opening degree which corresponds to said depression degree of the accelerator pedal;

a fifth step of reengaging the clutch.

2. A method as claimed in claim 1, wherein the closing movement of the throttle valve is temporally suspended when the throttle valve has moved to an intermediate opening degree between said initial opening degree and said closed position.

3. A method as claimed in claim 2, wherein the speed of the closing movement of the throttle valve before the throttle valve arrives at said intermediate opening degree is slower than the speed of the closing movement which resumes from said intermediate position.

4. A method as claimed in claim 1, wherein the speed of the closing movement of the throttle valve until an instance when the throttle valve arrives at an intermediate opening degree between said initial opening degree and said closed position is slower than the speed of the closing movement after said instance.

* * * * *